Dec. 3, 1946.  M. H. TAYLOR ET AL  2,412,017
MEASURING APPARATUS
Filed Jan. 3, 1944  2 Sheets-Sheet 1

Inventors
M. H. Taylor
T. W. Clifford
By
Attorneys

Dec. 3, 1946.    M. H. TAYLOR ET AL    2,412,017
MEASURING APPARATUS
Filed Jan. 3, 1944    2 Sheets-Sheet 2

Inventors
M.H.TAYLOR
By T.W.CLIFFORD
Attorneys

Patented Dec. 3, 1946

2,412,017

UNITED STATES PATENT OFFICE 2,412,017

MEASURING APPARATUS

Mark Herschel Taylor and Thomas William Clifford, Leicester, England, assignors to Taylor, Taylor & Hobson Limited, Leicester, England, a company of Great Britain Application January 3, 1944, Serial No. 516,872
In Great Britain December 2, 1942

12 Claims. (Cl. 51—165)

This invention relates to apparatus for accurately determining the position of a point in a reference plane in accordance with two coordinates. Although the apparatus may be employed for other measuring purposes, one important use is for ensuring accurate movement of a grinding or cutting or other tool relatively to the work in a copying machine, wherein it is often desired to control relative movement between the tool and the work in accordance with accurate coordinate measurements. Usually, for such purposes, the machine is provided with mutually perpendicular slideways, but a slight error in the angle between the slideways due to faulty manufacture or to progressive wear will involve errors in all the work cut on the machine. The trueing of slideways in such machines calls for highly accurate workmanship on a large scale and involves heavy cost. One important object of the invention is to ensure that the relative location of tool and work can be effected with the desired high degree of accuracy, irrespective of the accuracy of the slideways of the machine, by the use of microscope graticules which can be produced with the necessary degree of accuracy relatively easily and economically.

Figure 1:
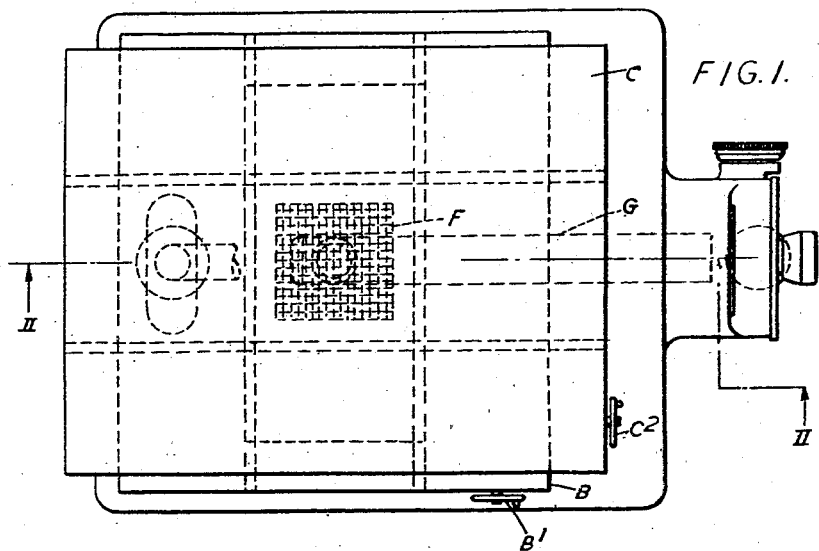
Figure 2:
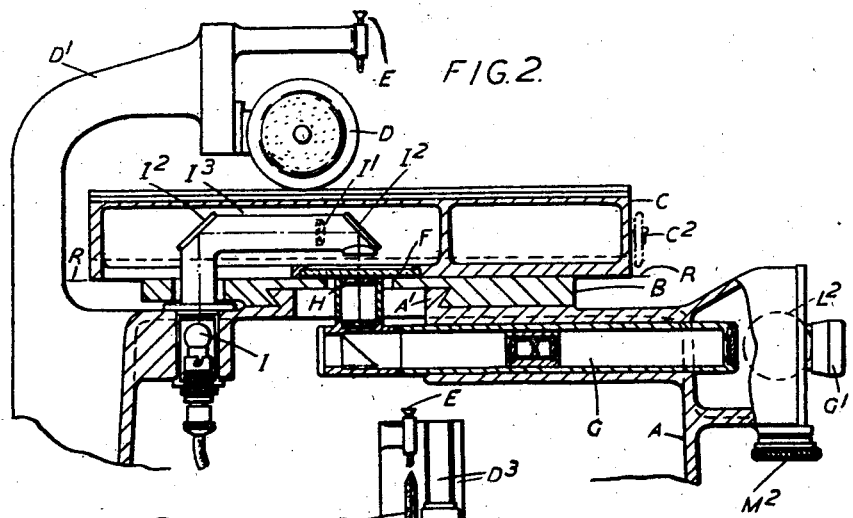
Figure 3:
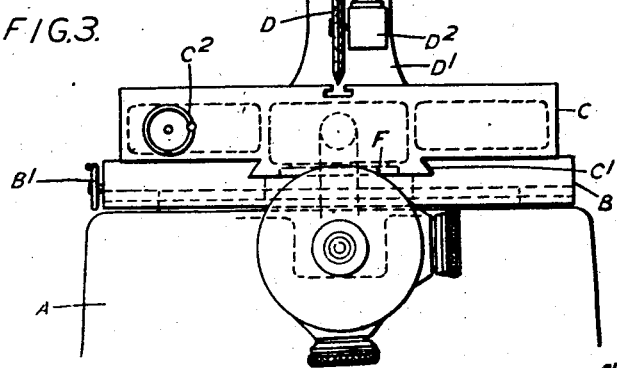
Figure 4:
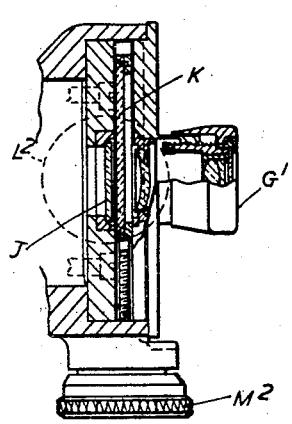
Figure 5:
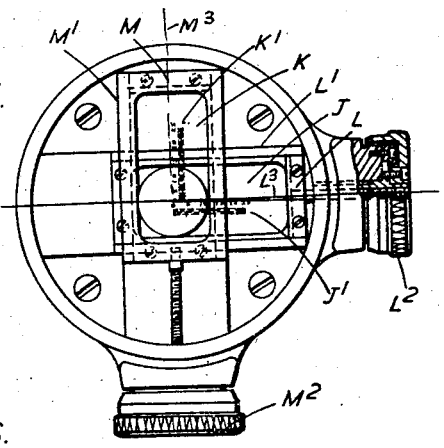
Figure 6:
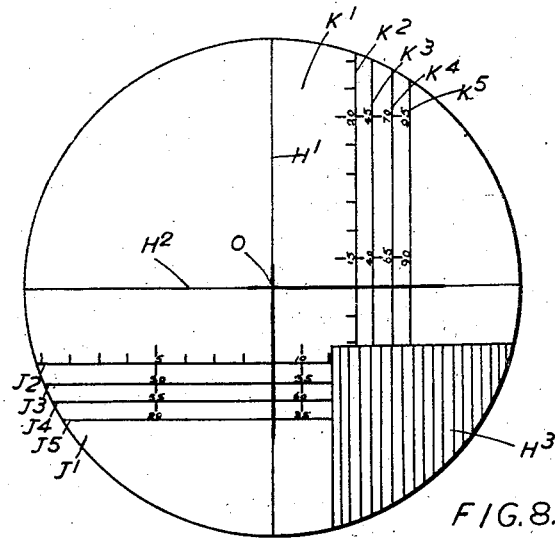
Figures 7, 8:
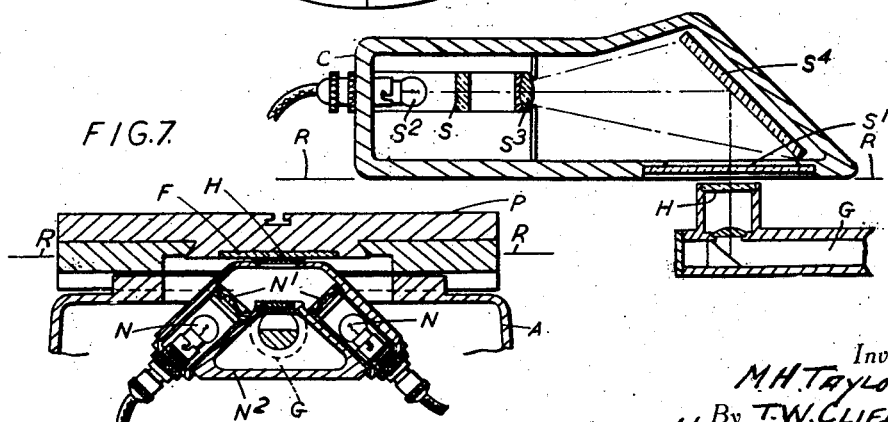

Other objects of the invention will be apparent from the appended claims and from the following description of the accompanying drawings, which show one application of the invention to a copying machine, and also some modifications thereof. In these drawings Figure 1 is a plan of the work support or table, Figure 2 is a section on the line II—II of Figure 1 and including the tool and work microscope which are omitted from Figure 1, Figure 3 shows the machine in end elevation, Figure 4 is a section, on an enlarged scale, through the eyepiece and associated parts of the measuring microscope, Figure 5 is an end elevation of Figure 4 with the eyepiece of the microscope and the supporting plate therefor detached, Figure 6 illustrates, on an enlarged scale, the images as viewed through the measuring microscope, and Figures 7 and 8 show two modified arrangements respectively for illuminating the reference plane.

In the construction shown in Figures 1 to 6 the machine comprises a base or pedestal A having formed thereon guides $A^1$ along which a slide B can be horizontally adjusted by means of a handwheel $B^1$. The slide B is furnished with guides $C^1$ along which a main slide or work support C can be moved by a handwheel $C^2$. The work support C can thus be moved in all directions in the horizontal plane within the limits of the guides $A^1$ and $C^1$.

The tool, which is indicated, by way of example, as a grinding wheel D, is carried by a bracket $D^1$ mounted on or forming part of the pedestal A, the grinding wheel and the driving motor $D^2$ therefor being vertically adjustable along guides $D^3$. Thus, by adjusting the work support C the operative edge of the grinding wheel D can be caused to reproduce on the work a desired outline in accordance with basic data, a work microscope E carried by the bracket $D^1$ being so arranged that its vertical optical axis represents the operative edge of the grinding wheel. It will, however, be appreciated that the nature of the tool will depend upon the operation to be performed on the work, and may consist, for example, of an end mill for cutting the workpiece, or of a stylus or other marking device for imparting surface markings to the work.

For the purpose of accurately adjusting the work relatively to the axis of the microscope E in accordance with accurate coordinate measurements, a grid consisting of two sets of lines spaced to constitute graduations in accordance with the system of coordinates is marked on the lower surface of a glass plate F (hereinafter referred to as the grid) carried by the work support C, the plane of the grid F, that is to say the lower surface of the plate bearing the mutually perpendicular sets of lines in chessboard formation, constituting the reference plane which is indicated at R. The lines of the grid F may bear appropriate graduation markings.

Arranged in the pedestal A is a measuring microscope generally indicated at G and having a fixed graticule H carrying two reference lines $H^1$, $H^2$ at right angles to each other, the point of intersection O of the reference lines $H^1$, $H^2$ being coincident with the optical axis of the work microscope E. It will be understood that for purposes of accuracy the upper or operative surface of the fixed graticule H lies as close as practicable to the lower surface of the grid F, that is to say as nearly as possible in the reference plane R. The grid F and reference lines $H^1$, $H^2$ are imaged, by the optical system of the microscope G, in the plane of two movable graticules J and K whose graticule surfaces are arranged face to face and as near together as possible as shown in Figure 4. The superimposed images of the grid F, fixed graticule H, and the scales on the movable graticules J and K are viewed through the eyepiece $G^1$ of the microscope G. The grid F is illuminated by light transmitted from a lamp I through a collimating lens $I^1$ and mirrors $I^2$, and through the grid F, the lamp, collimating lens and mirrors being carried as a unit in a casing $I^3$ by the pedestal A. The axis of illumination of the grid F is thus coincident with the optical axis of the two microscopes E and G, that is to say the point of intersection O of the two reference lines $H^1$ and $H^2$ which point constitutes the index point or origin to be located in the desired position relatively to the grid F.

The scales $J^1$ and $K^1$ of the movable graticules J and K extend in directions at right angles to one another as clearly shown in Figures 5 and 6, the movable graticule scale $J^1$ being associated with the fixed reference line $H^1$ whilst the movable graticule scale $K^1$ is associated with the fixed reference line $H^2$, each movable graticule scale extending at right angles to its associated reference line. As shown in Figure 6 the graticule scales $J^1$ and $K^1$ appear at the sides of the microscope field so as to leave the central portion of this field free except for the crossed reference lines $H^1$ and $H^2$, a fixed mask $H^3$ being provided over the graticule H so as to cover over the corner where the two graticule scales $J^1$, $K^1$ intersect. The mask $H^3$ thus obscures the area where some confusion due to superimposition of the scales $J^1$ and $K^1$ would otherwise appear.

The graticules J and K are carried respectively by frames L and M which are longitudinally adjustable along guides $L^1$ and $M^1$ by means of thumbscrews $L^2$ and $M^2$. Though the scales $J^1$ and $K^1$ are at right angles to their associated reference lines $H^1$ and $H^2$ respectively, the guides $L^1$ and $M^1$ are slightly inclined to the lengths of their respective graticule scales $J^1$ and $K^1$ as clearly indicated by the longitudinal centre lines $L^3$ and $M^3$ of the guides $L^1$, $M^1$ in Figure 5. Each of the graticule scales $J^1$ and $K^1$ consists of four parallel datum lines $J^2$ to $J^5$ and $K^2$ to $K^5$, each datum line having appropriately marked graduation lines across it. The spacings between the datum lines of each set $J^2$ to $J^5$ and $K^2$ to $K^5$ and between the graduation lines thereon bear a predetermined relationship to the spacings between the lines on the grid F dependent upon the tangent of the inclination of the guides $L^1$, $M^1$ to the lengths of the scales $J^1$, $K^1$.

For example, each spacing between adjacent lines on the grid F may represent one tenth of an inch and, allowing for the magnification of the microscope G, the graduation markings on the scales $J^2$ to $J^5$ and $K^2$ to $K^5$ may represent thousandths of an inch. For this the said inclination between the length of each guide $L^1$, $M^1$ and the length of the associated graticule scale $J^1$, $K^1$ would have a tangent equal to one fortieth, so that the lateral component of the graticule movement is equal to one fortieth of the longitudinal movement.

In the zero position of each graticule $J^1$ or $K^1$ the first datum line $J^2$ or $K^2$ is so spaced from the parallel fixed reference line $H^2$ or $H^1$ as to correspond to an integral number of squares of the grid F. When each movable graticule scale comprises four datum lines as shown the first datum line $J^2$ or $K^2$ will bear cross graduations from 0 to .025. The second datum line $J^3$ or $K^3$ is spaced from the datum line $J^2$ or $K^2$ by a distance equal to the lateral component of the full movement of the graticule J or K from the zero mark to the .025 mark on the datum line $J^2$ or $K^2$, the second datum line $J^3$ or $K^3$ bearing cross graduations from .025 to .050. The third and fourth datum lines $J^4$, $K^4$ and $J^5$, $K^5$ are similarly spaced and respectively bear cross graduations from .050 to .075 and from .075 to .100. Thus, with the graticule J or K in its zero position it will be superimposed on a line of the grid F, and if this graticule is moved from the said zero position to its other end position the fourth datum line $J^5$ or $K^5$ will be superimposed on the next line of the grid F.

Thus, it will be seen that the position of the origin O representing the position of the operative edge or point of the tool can be accurately set relatively to the work in accordance with two coordinates by first setting the two graticules J and K to two specified readings corresponding to the two coordinates, the appropriate graduation on each of the datum lines ($J^2$ to $J^5$ or $K^2$ to $K^5$) being brought into coincidence with the associated reference line $H^1$ or $H^2$. The work table C is then adjusted by the hand wheels $B^1$ and $C^2$ until the index or origin O lies in a chosen square on the grid F and the said datum lines are superimposed on grid lines. The origin O, and therefore the operative edge or point of the tool now lies in a position relatively to the work accurately in accordance with the said co-ordinates.

The scale lines as J are so positioned on the graticule as to lie parallel to the lines of the grid. However, the inclination of the guide in which the graticule travels serves to move the scale lines in a direction that is parallel to the line $H^1$, while the said scale lines also move over the reference line $H^1$ at right angles to bring the scale graduations successively into registration with the reference line $H^1$. The spacing of the graduations is so related to the angle of inclination of the guide to the reference line $H^2$, and the grid lines to which the scale lines are parallel, as to make the graduations serve as an indication of the distance that the scale on which the particular graduation appears has travelled away from the grid line with which the scale line was in registration before the motion was begun. The inclination of the guides is such, and the scales are so graduated, as to render the scale system capable of subdividing a square of the grid. Movement of the graticules to their extremities of inward motion in the guides positions the scale lines in registration with lines of the grid, i. e., an integral number of grid squares away from the reference point O. With the graticules so set, and assuming that a downward movement of 0.1 of a grid square is wanted, the graticule $J^1$ is moved until the 0.1 graduation of scale line $J^2$ is in registration with the reference line $H^1$. Due to the inclination of the graticule guide, the scale line $J^2$ will at this point have reached a position one-tenth of a grid square below the grid line with which it was co-incidental before movement of the graticule began. At this time, movement of the work through a distance equal to one-tenth of a grid square can be accomplished by adjustment of the support C, and the work secured thereto, until the scale line $J^2$ has been brought back to registration with the grid line with which it was coincidental before adjustment was begun.

Since the various datum lines are calibrated according to various divisions of grid squares, and since the various datum lines are spaced apart in such manner as to render the calibration in register with reference line H¹ an accurate designation of the portion of a grid square that lies between the line on which the calibration appears and the original grid line, it is evident that selection of the scale is made in accordance with the division of the grid square that is wanted. That is to say, the scale having thereon the calibration indicating the wanted division is the one that governs the position to which the graticule is moved to obtain the wanted division.

Having used the graduation on one datum line in cooperation with the associated normal reference line, the grid is brought into registration with that line.

Conversely, the exact position of the index point or origin O, relatively to the grid F can at any time be accurately measured by first moving one graticule J or K until one of the datum lines is superimposed on a line of the grid F and reading the graduation on the datum line where this is intersected by its associated reference line H¹ or H², and then carrying out the same process with the other movable graticule for the other coordinate measurement.

In order to prevent confusion the associated lines on the fixed and movable graticules and on the grid may be differentially coloured to distinguish them from each other. For example, the graticule datum lines J² to J⁵ may be coloured red whilst the associated reference line H¹ is coloured green, the datum lines K² to K⁵ being green and the reference line H² red. In order to reduce eye-strain, however, all the lines may be of the same colour but with different colour densities for the lines of the grid, fixed graticule and movable graticules.

Figure 7 shows a modified arrangement of the system for illuminating the reference plane. In this arrangement two lamps N are arranged on opposite sides of the optical axis of the microscope G, each lamp having an associated condenser N¹ so that the reference plane R is illuminated by two light beams each at 45° to the reference plane. With this arrangement the lamp housing N² and support for the fixed graticule H are formed as a unit with the measuring microscope G. The grid F may have a whitened upper surface so as to scatter the light back towards the microscope G. The arrangement shown in Figure 7 is particularly of advantage in that the top surface of the work support P can be arranged nearer to the reference plane R whereby risk of inaccuracies is reduced.

According to a modification of the arrangement shown in Figure 7 the lines of the grid F may be marked directly on the lower surface of the work support P instead of on the lower face of a plate carried by the work suppport.

Yet a further arrangement is shown in Figure 8 in which an image of a grid S is projected on to a screen S¹ by means of a light source S², projection objective S³ and mirror S⁴ so that the grid is imaged in the reference plane R.

It will be understood that the constructions described above are given by way of example only and that details may be modified to suit requirements. For example, though the invention has been described with the grid arranged on the work support, the grid may be arranged on a part of the machine movable in accordance with the movement of the work support.

What we claim as our invention and desire to secure by Letters Patent is:

1. Apparatus for accurately determining the position of a point in a reference plane in accordance with two Cartesian coordinates, comprising a support, a grid carried by the support and consisting of two sets of lines equally spaced apart in mutually perpendicular directions and arranged in and movable in all directions parallel to the reference plane, a measuring microscope carried by the support, a fixed graticule on the microscope having a pair of crossed reference lines thereon, two movable graticules on the microscope each graticule having a linear scale thereon, the two sets of grid lines, the crossed reference lines and the graticule scales being viewed by the microscope in the reference plane with the graticule scales intersecting the two sets of grid lines at right angles whilst the crossed reference lines are parallel to the two sets of grid lines respectively, and means whereby each movable graticule is adjusted independently in directions inclined to the length of the reference line parallel to the scale of that graticule by an angle whose tangent is represented by the distance between adjacent grid lines divided by the length of the graticule scale, the transverse component of the graticule movement from zero setting, when the zero of the scale lies on the reference line normal to the scale, moving the graticule scale along that reference line until, at maximum setting of the graticule, the maximum graduation thereon lies on the said reference line at a distance from the original position of the zero equal to the spacing between the grid lines, so that the grid lines, in cooperation with the reference lines, measure the movement of the grid relatively to the origin in the integers of the two coordinates whilst the graticule scales in cooperation with the reference lines respectively measure the fractions of the two coordinates, the grid, when arranged with two of its mutually perpendicular lines in registration respectively with the graticule scales by which the fractional settings have been made, being accurately in the position relatively to the origin of the fixed graticule in accordance with the two coordinates.

2. Apparatus for accurately determining the position of a point in a reference plane as claimed in claim 1, in which each movable graticule scale comprises a datum line extending in the direction of the length of the scale crossed by the graduation lines so that each datum line cooperates with the set of grid lines parallel thereto whilst the cross graduation lines cooperate with the reference line normal to that datum line.

3. Apparatus for accurately determining the position of a point in a reference plane as claimed in claim 1, in which each movable graticule scale comprises a plurality of datum lines extending in the direction of the length of the scale with each datum line crossed by an equal number of graduations corresponding to a fraction of the total graticule scale represented by the reciprocal of the number of datum lines, the cross graduation lines of any selected datum line bearing the fraction to be measured along the reference line normal thereto cooperating with any of the grid lines parallel to that datum line.

4. Apparatus for accurately determining the position of a point in a reference plane as claimed in claim 1, in which the movable graticule scales lie adjacent to the sides of the field of view of the measuring microscope so that the central portion of said field is unobstructed except for the crossed reference lines, and a mask is provided which obscures that part of the field where the two movable graticule scales intersect.

5. A copying machine comprising, a work support, a tool support, a grid carried by the work support and consisting of two sets of lines spaced apart in mutually perpendicular directions to constitute graduations in accordance with a Cartesian system of coordinates, means for adjusting the work support relatively to the tool support in two directions parallel to the two sets of grid lines respectively, a measuring microscope fixed relatively to the tool support, a fixed graticule in said microscope having crossed reference lines parallel respectively to the two sets of grid lines and whose point of intersection or origin is in alignment with the operative edge of the tool, two movable graticules in the measuring microscope each such graticule having a scale with cross graduations, the grid lines, reference lines and graticule scales being viewed in the reference plane through the microscope with the reference lines parallel to the two sets of grid lines and the graticule scales at right angles to the two reference lines respectively, means for adjusting each graticule scale in a direction slightly inclined to the length of the reference line parallel to that scale by an angle whose tangent is represented by the distance between adjacent grid lines divided by the length of the graticule scale, the transverse component of the graticule movement from zero setting, when the zero of the scale lies on the reference line normal to the scale, moving the graticule scale along that reference line until, at maximum setting of the graticule, the maximum graduation thereon lies on the said reference line at a distance from the original position of the zero equal to the spacing between the grid lines, so that the grid lines, in cooperation with the reference lines, measure the movement of the grid relatively to the origin in the integers of the two coordinates whilst the graticule scales in cooperation with the reference lines respectively measure the fractions of the two coordinates, the grid, when arranged with two of its mutually perpendicular lines in registration respectively with the graticule scales by which the fractional settings have been made, being accurately in the position relatively to the origin of the fixed graticule in accordance with the two coordinates.

6. A copying machine as claimed in claim 5, in which means are provided for illuminating the grid in the reference plane.

7. A copying machine as claimed in claim 5, in which the grid is obliquely illuminated simultaneously from two sources on opposite sides of the optical axis of the measuring microscope.

8. A copying machine as claimed in claim 5, in which the grid is superimposed on the work support by optical projection.

9. A copying machine as claimed in claim 5, in which each movable graticule is carried by a slide movable along a guide which is slightly inclined to the length of the scale.

10. A copying machine comprising a main support or pedestal, a tool carried by said pedestal, a work support, means for adjusting the work support horizontally in two directions at right angles to each other, a work microscope carried by the pedestal and whose optical axis is in alignment with the operative edge of the tool, a grid carried beneath the work support so as to lie in a reference plane, said grid comprising two sets of lines spaced to constitute graduations in accordance with a system of coordinates, means carried by the pedestal for illuminating the grid, a measuring microscope carried by the pedestal and comprising a fixed graticule parallel to and closely spaced from the grid, said fixed graticule having marked thereon two crossed reference lines parallel respectively to the two sets of grid lines and whose point of intersection or origin is in alignment with the optical axis of the work microscope, two movable graticules constituting part of the measuring microscope and having scales which, as viewed through the measuring microscope in the reference plane extend at right angles to the two reference lines respectively, each movable graticule scale comprising a plurality of datum lines with cross graduations, two slides carrying the movable graticules respectively, two guides for said slides and each of which is inclined slightly to the length of the cooperating reference line by an angle whose tangent is represented by the distance between adjacent grid lines divided by the length of the graticule scale, means for adjusting the slides along the guides, the transverse component of the graticule movement from zero setting, when the zero of the scale lies on the reference line normal to the scale, moving the graticule scale along that reference line until, at maximum setting of the graticule, the maximum graduation thereon lies on the said reference line at a distance from the original position of the zero equal to the spacing between the grid lines, so that the grid lines, in cooperation with the reference lines, measure the movement of the grid relatively to the origin in the integers of the two coordinates whilst the graticule scales in cooperation with the reference lines respectively measure the fractions of the two coordinates, the grid, when arranged with two of its mutually perpendicular lines in registration respectively with the graticule scales by which the fractional settings have been made, being accurately in the position relatively to the origin of the fixed graticule in accordance with the two coordinates.

11. A copying machine as claimed in claim 10, in which the movable graticule scales lie at the sides of the field of view of the measuring microscope so as to leave the central portion of said field unobstructed except for the reference lines, and the measuring microscope is furnished with a mask which obscures that part of the said field where the movable graticule scales intersect.

12. A copying machine as claimed in claim 10, in which the illuminating means comprises a casing formed as a unit with the measuring microscope and containing two light sources by which the grid is simultaneously illuminated obliquely from opposite sides of the optical axis of the measuring microscope.

MARK HERSCHEL TAYLOR.
THOMAS WILLIAM CLIFFORD.